United States Patent
Suzudo

[11] Patent Number: 6,111,900
[45] Date of Patent: *Aug. 29, 2000

[54] SOLID-STATE LASER APPARATUS AND METHOD WITH SECOND HARMONIC WAVE FEATURES

[75] Inventor: Tsuyoshi Suzudo, Natori, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/041,622

[22] Filed: Mar. 13, 1998

[30] Foreign Application Priority Data

Mar. 13, 1997 [JP] Japan .................................. 9-079036

[51] Int. Cl.⁷ .................................................. H01S 3/10
[52] U.S. Cl. ................................ 372/22; 372/98; 372/92
[58] Field of Search ................................ 372/21, 22, 92, 372/98, 25

[56] References Cited

U.S. PATENT DOCUMENTS

| | | | |
|---|---|---|---|
| 5,123,025 | 6/1992 | Papuchon et al. | 372/21 |
| 5,287,381 | 2/1994 | Hyuga et al. | 372/22 |
| 5,315,433 | 5/1994 | Okazaki et al. | 372/22 |
| 5,331,650 | 7/1994 | Maeda et al. | 372/22 |
| 5,363,391 | 11/1994 | Matthews et al. | 372/21 |
| 5,388,114 | 2/1995 | Zarrabi et al. | 372/22 |
| 5,430,754 | 7/1995 | Suzuki et al. | 372/22 |
| 5,432,807 | 7/1995 | Okazaki et al. | 372/22 |
| 5,651,022 | 7/1997 | Antrhon et al. | 372/92 |
| 5,651,023 | 7/1997 | MacKinnon | 372/92 |
| 5,732,100 | 3/1998 | Thony et al. | 372/92 |
| 5,802,086 | 9/1998 | Hargis et al. | 372/22 |
| 5,825,798 | 10/1998 | Momiuchi et al. | 372/22 |
| 5,832,010 | 11/1998 | Fulbert et al. | 372/92 |
| 5,844,932 | 12/1998 | Thony et al. | 372/92 |

FOREIGN PATENT DOCUMENTS

| | | |
|---|---|---|
| 5-211360 | 8/1993 | Japan . |
| 6-152045 | 5/1994 | Japan . |

*Primary Examiner*—Leon Scott, Jr.
*Attorney, Agent, or Firm*—Oblon, Spivak, McClelland, Maier & Neustadt, P.C.

[57] ABSTRACT

A solid-state laser apparatus and method in which a laser crystal and a non-linear optical crystal are connected and unitarily combined by a spacer. An optical resonator is constructed between both ends thereof. An optical cavity where the laser light passes through is formed between the laser crystal and the non-linear optical crystal. An end surface of the laser crystal is treated by optical polishing to form a laser resonator in the optical cavity. Alignment between the crystal becomes unnecessary, and subsequent assembling is thus simplified. Fresnel reflection occurs on the end surface of a laser crystal treated only by the optical polishing due to an index of refraction coefficient difference.

44 Claims, 6 Drawing Sheets

SOLID-STATE LASER APPARATUS AND METHOD WITH SECOND HARMONIC WAVE FEATURES

BACKGROUND OF THE INVENTION

1. Field of the Invention

The present invention relates to a small-sized solid-state laser apparatus, in particular, an optical pickup, an optical printer apparatus, or an exciting light source apparatus, for example, for use in optical measurement, non-linear wavelength conversion, and other applications.

2. Description of the Related Arts

In recent years, high power semiconductor lasers have been made at low cost, and thereby the activities of the research and development and the sales of future merchandise have been spurred in the field of solid-state laser crystals excited by the semiconductor laser.

Regarding such a solid-state laser crystal, since the spectrum width of the exciting light source thereof is very narrow, as compared with that of conventional lamp excitement, the solid-state laser operates very effectively. Furthermore, the size of the semiconductor laser employed as the exciting light source can be made small. Such a solid-state laser crystal is very suitable for being miniaturized and operating with high efficiency. Moreover, such a solid-state laser crystal has a feature that not only can support high power successive oscillation at room-temperature and realize high quality beam, but the solid-state laser crystal is very superior in the energy accumulating property and frequency stability.

Furthermore, in the wave conversion technology utilizing the above-mentioned solid-state laser and the non-linear optical crystal, research and development and the sales thereof have been highly advanced. In particular, the generation of a secondary harmonic wave of the solid-state laser fundamental wave does not damage the preferable beam property of the solid-state laser fundamental beam, and only the wavelength thereof can be converted to the half wavelength. Consequently, such a solid-state laser crystal can be expected to serve in the future as a visible light source such as blue, green, etc. and as an exciting light source for use in an ultraviolet light source realized by generating a fourth harmonic wave of the solid-state laser fundamental wave. Research and development and sales of future products employing such a solid-state laser crystal have been performed actively.

The utilization of laser light sources is widely applied to mechanical processing, measurement, and so on. However, the production of a small-sized and lightweight light source is needed for the light source to be portable, or used in an optical pickup, etc. In order to realize such light sources, the structure of the laser as shown in FIG. 5 is adopted generally.

Figure 5:
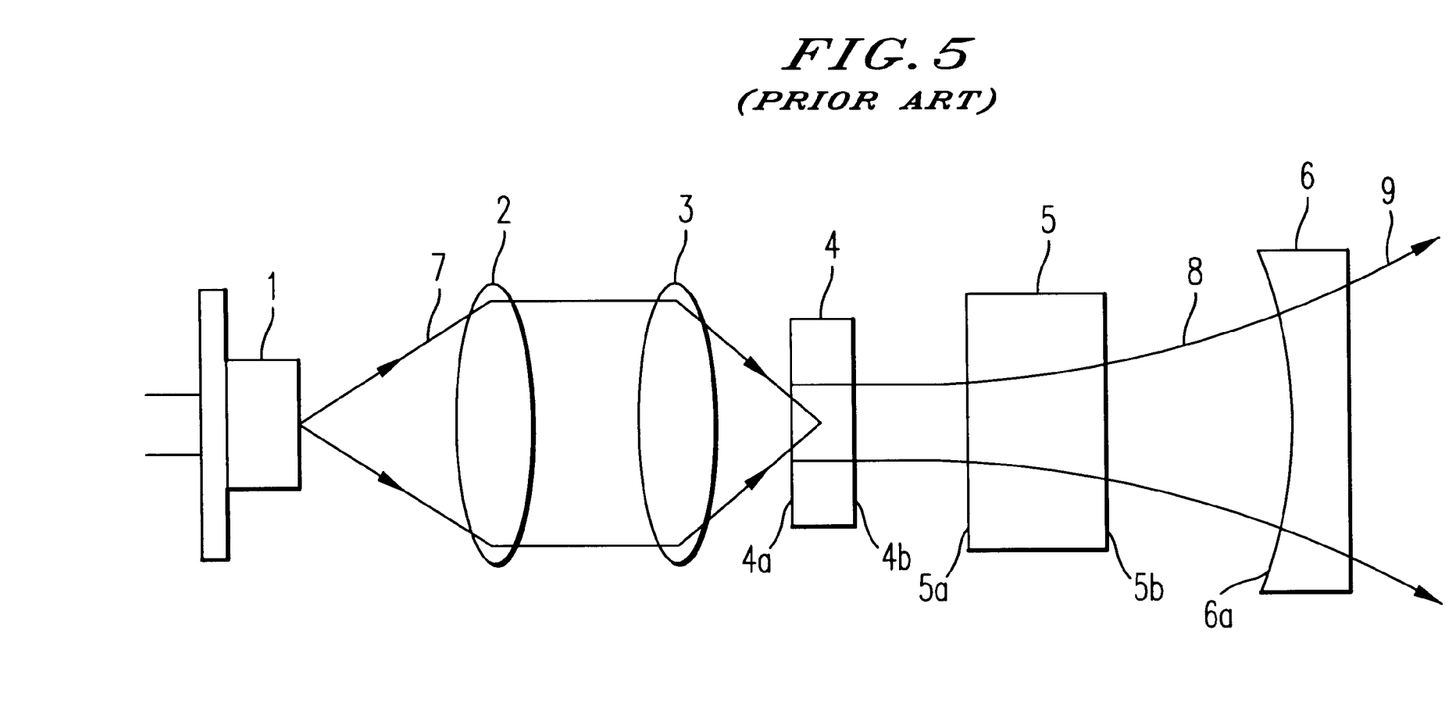
FIG. 5 is an explanatory diagram showing the main structural part of an example of the prior-art solid-state semiconductor laser.

FIG. 5 is an explanatory diagram for explaining an example of the solid-state laser apparatus described in the published specification of Japanese Laid-open Patent Publication No. 6-152045/1994. In FIG. 5, the reference numeral 1 represents an exciting semiconductor laser, 2 a collimation lens for collimating the semiconductor laser light, 3 a focusing lens for focusing the semiconductor laser light, 4 a laser crystal, 5 a non-linear optical crystal for generating a secondary harmonic wave, and 6 an output mirror.

Dielectric coatings 4a and 4b are formed on both end surfaces of the laser crystal 4. The end surface of the laser crystal at the side of the incident semiconductor laser light is formed such that the reflection coefficient of the end surface at the incident light side is high for the laser fundamental wavelength, also high for the secondary harmonic wavelength, and the transmission coefficient is high for the semiconductor laser light wavelength. At the end surface at the interior side of the resonator, the transmission coefficient is set to a high value for the laser fundamental wavelength and the secondary harmonic wavelength. Dielectric substance coatings are also formed on both end surfaces of the non-linear optical crystal 5 for generating the secondary harmonic wave, such that the transmission coefficients of both end surfaces are respectively set to high values for the laser fundamental wavelength and for the secondary harmonic wavelength.

A dielectric substance coating is formed on the output mirror such that the reflection coefficient thereof is set to a high value for the laser fundamental wavelength and the transmission coefficient thereof is also set to a high value for the secondary harmonic wavelength.

By setting the reflection coefficients on the respective end surfaces as mentioned above, the resonator for the laser fundamental wavelength is constructed between the exciting-side end surface and the output mirror. The non-linear optical crystal for generating the secondary harmonic wave is disposed in the interior thereof. In such a construction, it is possible to generate the secondary harmonic wave with high efficiency by utilizing the high light intensity of the laser fundamental wave in the interior of the resonator.

In the laser apparatus of the construction mentioned above, the parts are respectively separated. Therefore, there exist some problems to be solved in that a holder for the parts is required to be prepared at the time of assembling those parts as the apparatus and the adjustment works have to be done after assembling. Furthermore, there exist some other problems to be solved in that the number of used parts turns out to be large and the cost of manufacturing rises. Those problems obstruct the miniaturization of the apparatus and thereby result in making the apparatus large-sized. Furthermore, it is impossible to provide the apparatus at low cost.

Figure 6A:
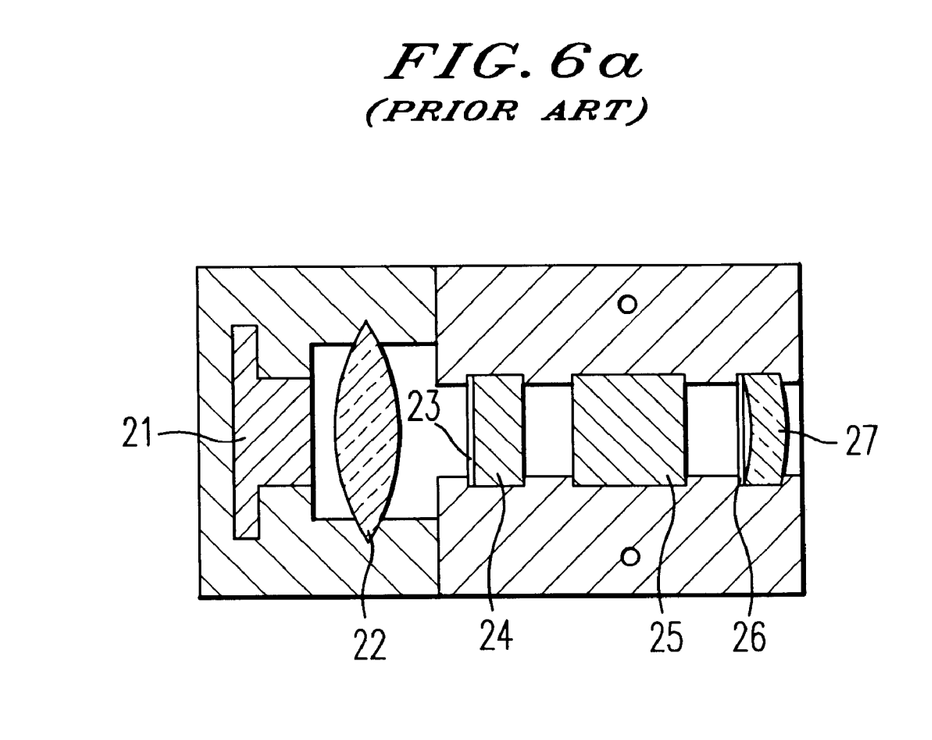
FIGS. 6a and 6b are explanatory diagrams showing the main structural part of another example of the prior-art solid-state semiconductor laser.
Figure 6B:
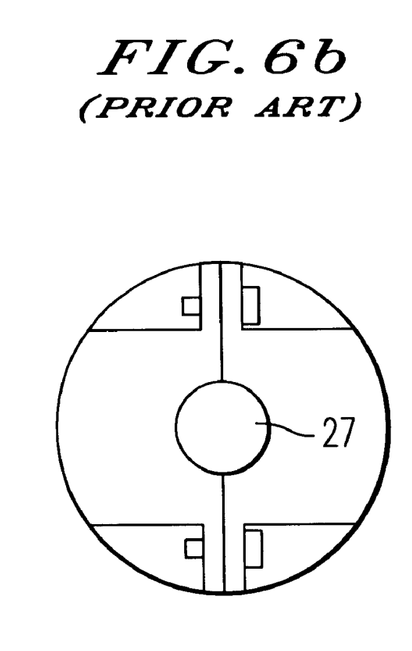

FIGS. 6a and 6b are structural diagrams showing an example of conventional technology shown in published specification of Japanese Laid-open Patent Publication No. 5-211360/1993. The structure thereof is constructed with, as shown in FIG. 6a, an exciting semiconductor laser 21, a semiconductor laser focusing lens 22, a laser crystal 24, a non-linear optical crystal 25 for generating the secondary harmonic wave, and an output mirror 27.

Dielectric coatings are respectively formed on the laser crystal 24, the non-linear optical crystal 25 for generating the secondary harmonic wave, and the output mirror, in the same way as in the case of FIG. 5. The laser apparatus of the above-mentioned structure operates in the same way as that of FIG. 5.

The structure as shown in FIGS. 6a and 6b is realized for the purpose of preventing (or eliminating) the alignment shift of the optical parts of the solid-state laser crystal excited by the semiconductor laser. As shown in FIG. 6b, a groove for holding the optical parts is formed (engraved) on the enclosing rod having a shape of a pair of half-cut cylinders, and the optical parts are inserted therebetween. In such manner, alignment shift can be prevented. Even in such a structure, the number of the parts used cannot be reduced and thereby miniaturization of the apparatus is difficult to achieve.

Furthermore, in the structures of the two examples mentioned above, there exists no selectivity for the laser longitudinal mode. When the output of the semiconductor laser is made large (in the case of strong excitement), the laser longitudinal mode turns out to be a multiple mode and thereby the laser property is lowered (deteriorated). Furthermore, the conversion efficiency to the secondary harmonic wave may become difficult. Consequently, it turns out to adversely effect high efficiency laser operation but the quality of the longitudinal and lateral modes thereof is improved.

For this reason, regarding the conventional small-sized laser light source, there exist some limitations in size, cost, efficiency, etc.

As mentioned heretofore, in the conventional solid-state laser apparatus, the respective parts arc separated from each other. When those parts are assembled to form the apparatus (solid-state laser apparatus), a holder is required to hold the respective parts and adjustment works are needed after assembling those parts.

In addition, there exist some other problems in that the number of parts increases and the cost of manufacturing the device rises. Parts count and cost serve as obstacles to the miniaturization of the apparatus. Therefore, the apparatus inevitably turns out to be large-sized. Moreover, it is impossible to provide the apparatus at low cost.

SUMMARY OF THE INVENTION

The present invention was made in consideration of the above-mentioned problems to be solved.

It is an object of the present invention to solve the problems as mentioned heretofore, as well as other objects.

It is another object of the present invention to provide an improved semiconductor laser apparatus.

It is still another object of the present invention to provide an improved solid-state laser crystal pump by the semiconductor laser.

It is still another object of the present invention to realize a miniaturized solid-state laser crystal pump by the semiconductor laser apparatus.

It is still another object of the present invention to improve the efficiency of the miniaturized solid-state laser apparatus and the quality of the longitudinal mode.

It is still another object of the present invention to improve the efficiency of the miniaturized solid-state laser apparatus and the quality of the lateral mode.

The first status of the present invention provides a solid-state laser apparatus with a laser crystal, a semiconductor laser for exciting the laser crystal, and an optical resonator for generating laser fundamental wave. A non-linear optical crystal for generating a secondary harmonic wave is disposed in the interior of the optical resonator. The optical resonator utilizes the end surface of either one of the laser crystal and the non-linear optical crystal for generating the secondary harmonic wave. The laser crystal and the non-linear optical crystal are arranged adjacent to each other and combined unitarily.

In such structure, not only the apparatus itself can be made small-sized, but it is not necessary to take optical alignment into consideration.

The second status of the present invention in connection with the solid-state laser apparatus of the first status is featured in that a surface of the laser crystal adjacent to that of the non-linear optical crystal for generating the secondary harmonic wave is treated only by optical polishing, and the laser crystal disposed on the light transmitting portion in the interior of the optical resonator composed of a laser resonator and the non-linear optical crystal for generating the secondary harmonic wave respectively have a cavity, of square cross-section formed therein at least capable of transmitting the laser light therethrough.

In such structure, not only the same functional effect as that of the first status can be obtained, but the laser property, in particular, the longitudinal mode property of the laser can be improved. Furthermore, the efficiency of the conversion to the secondary harmonic wave can be enhanced, in addition to the above-mentioned functional effects.

The third status of the present invention in connection with the solid-state laser apparatus of the first or second status is featured in that a part capable of partially reflecting the laser fundamental wave is formed on the end surface of the laser crystal at the side of the non-linear optical crystal for generating the secondary harmonic wave.

In such structure, the functional effect of improving the laser longitudinal mode property is further enhanced and thereby the laser quality and the conversion effect can be further improved, in addition to the functional effects of the second status.

The fourth status of the present invention in connection with the solid-state laser apparatus of the first, second or third status is featured in that a microlens made of optical glass material for focusing the semiconductor laser light is unitarily provided on the end surface at the side on which the laser crystal is excited.

In such structure, the shape of the exciting light is approximated to that of the resonator mode and the laser quality (in particular, the lateral mode) property is improved. Thereby, the effect of the conversion to the secondary harmonic wave can be improved and it is not necessary to take the alignment of the lens, etc. into consideration.

The fifth status of the present invention in connection with the solid-state laser apparatus of the fourth status is featured in that the microlens is also commonly used as a mirror for use in the laser resonator.

In such structure, not only the laser lateral mode can be improved, the efficiency of the conversion to the secondary harmonic wave can be enhanced, and the overall efficiency can be raised, but the quality of the laser lateral mode can also be improved.

The sixth status of the present invention in connection with the solid-state laser apparatus of the first, second or third status is featured in that a micromirror, for use in the optical resonator, made of optical glass material is unitarily provided on the end surface at the light emitting side of the non-linear optical crystal for generating the secondary harmonic wave.

In such structure, the laser resonator is the one of a semi-resonance focus type, the laser quality (in particular, the lateral mode) property is improved, and the efficiency of the conversion to the secondary harmonic wave can be enhanced. Furthermore, it is not necessary to take the alignment of the output mirror, etc. into consideration.

The seventh status of the present invention in connection with the solid-state laser apparatus of the fourth, fifth or sixth status is featured in that a cavity, of square cross-sectional measure, formed in said respective crystals of the microlens or the micromirror made of optical glass material at least capable of transmitting the laser light therethrough is provided between the respective adjacent crystals of the microlens or the micromirror, and the respective crystals are rigidly fixed to each other.

In such structure, an absorption material such as adhesive agent, etc. does not exist in the part through which the light passes, and thereby the optical (light) loss can be reduced. Consequently, the exciting efficiency, the laser efficiency, and the efficiency of the conversion to the secondary harmonic wave can be prevented from being deteriorated. Thereby, it is possible to realize a small-sized laser light source of high efficiency and high beam quality.

First Status

The solid-state laser apparatus of the first status of the present invention is constructed with a laser crystal capable of realizing linear polarization oscillation such as with a uniaxial crystal, a semiconductor laser for exciting the laser crystal, and a non-linear optical crystal capable of converting the laser fundamental wave to the secondary harmonic wave. The exciting semiconductor laser has a light emitting spectrum of the wavelength coinciding with the absorption wavelength of the laser crystal.

Both end surfaces of the laser crystal are treated with the dielectric coating substance. One of the end surfaces thereof at the side of receiving the incident exciting light is coated with the dielectric substance such that the reflection coefficient is set to a high value for the wavelength of the laser fundamental waveform and is also set to a high value for the wavelength of the secondary harmonic wave, and the transmission coefficient is set to a high value for the wavelength of the semiconductor laser light as the exciting light.

On the other hand, another end surface thereof is coated with the dielectric substance such that the transmission coefficient is set to a high value for the wavelength of the laser fundamental wave and that of the secondary harmonic wave.

The non-linear optical crystal for generating the secondary harmonic wave is cut in the crystal direction so as to satisfy phase matching for the laser fundamental wave. The end surface of the non-linear optical crystal is treated with the dielectric coating substance as in the case of the laser crystal.

The end surface at the side of the laser crystal is coated with the dielectric substance such that the transmission coefficient is set to a high value for the wavelength of the laser fundamental wave and that of the secondary harmonic wave. On the other hand, the end surface at the side of the secondary harmonic wave output is coated with the dielectric substance such that the reflection coefficient is set to a high value for the wavelength of the laser fundamental wave, and the transmission coefficient is set to a high value for the wavelength of the secondary harmonic wave.

Furthermore, as to the arrangement of the parts, the pumping semiconductor laser, the laser crystal, and the non-linear optical crystal for generating the secondary harmonic wave are arranged in this order. The exciting semiconductor laser is adjacently disposed to the laser crystal, and those elements excite the laser crystal without passing through the optical system, used for focusing the light.

The laser crystal and the non-linear optical crystal for generating the secondary harmonic wave are disposed at an angle so as to satisfy the phase matching condition. Both the laser crystal and the non-linear optical crystal are integrally combined in the state as mentioned above.

In such structure, the optical (light) resonator of the laser is formed between the end surface at the exciting side of the solid-state laser crystal and the end surface at the output side of laser secondary harmonic wave output, and the non-linear optical crystal is disposed in the interior of the resonator.

Concerning the operation of the solid-state laser apparatus, ions annexed to the laser crystal by the action of the exciting semiconductor laser is excited at first, and thereby fluorescent light of the wavelength of the laser fundamental wave is emitted therefrom. When the intensity of the exciting light is raised gradually, the laser fundamental wave causes an inductive discharge phenomenon by the action of the optical resonator and laser oscillation starting at that time.

However, as to the laser fundamental wave, since the reflection coefficient of both mirrors in the optical resonator is set to a high value, the output thereof almost cannot easily be taken. As a result, the high intensity laser fundamental wave remains in the interior of the resonator.

Hereupon, since the non-linear optical crystal for generating the secondary harmonic wave is disposed so as to satisfy the phase matching angle in the resonator, the laser high intensity fundamental wave in the resonator is radiated onto the non-linear optical crystal for generating the secondary harmonic wave as the incident light and the laser fundamental wave is converted to the secondary harmonic wave. Since the transmission coefficient of the secondary harmonic wave at the end surface of the output side of the non-linear optical crystal for generating the secondary harmonic wave is set to a high value, the secondary harmonic wave thus converted is taken from the side (end) surface. In such manner, the laser (apparatus) capable of outputting the secondary harmonic wave can be obtained. Hereupon, regarding the conversion to the secondary harmonic wave, the laser fundamental wave light of high intensity in the interior of the resonator can be utilized, and thereby the efficiency of the conversion can be raised.

Second Status

The structure of the solid-state laser apparatus of the second status of the present invention in connection with the first status is almost same as that of the first status. The first and second statuses differ from each other in the junction part between the laser crystal and the non-linear optical crystal for generating the secondary harmonic wave.

In the structure of the second status, the end surfaces of the laser crystal and the non-linear optical crystal adjacent to each other are processed only with optical polishing and not processed with dielectric substance coating. Furthermore, the junction surfaces of the both crystals are firmly fixed to each other, and a cavity is provided therebetween. The cavity has a square cross-section larger than that of the laser beam light passing therethrough.

The operation of the solid-state laser apparatus according to the second status is almost same as that of the first status. In the second status, the end surface of the laser crystal at the side of the non-linear optical crystal for generating the secondary harmonic wave is not processed with the dielectric substance coating. Instead, the cavity (air space) is provided between the laser crystal and the non-linear optical crystal for generating the secondary harmonic wave. In such structure, the end surface of the laser crystal at the side of the non-linear optical crystal has the reflection coefficient due to the Fresnel reflection for the laser fundamental wave. Consequently, the laser crystal itself can operate just like an etalon, and thereby the lines number of the longitudinal mode is reduced at the time of laser oscillation. As a result, the conversion efficiency of converting the laser light to the secondary harmonic wave is raised and thereby high-efficiency operation can be attained.

Third Status

The structure of the solid-state laser apparatus of the third status is almost same as that of the second status. The different point therebetween is that, in the third status, the end surface of the laser crystal at the side adjacent to the non-linear optical crystal for generating the secondary harmonic wave is treated with the dielectric substance coating such that the end surface thereof has a partial reflection coefficient for the laser fundamental wavelength and the transmission coefficient is raised for the secondary harmonic wave. Although the operation thereof is almost same as that of the second status, the etalon effect accomplished by the laser crystal is further strengthened by controlling the partial reflection coefficient, and further, the line number of the longitudinal mode of the laser fundamental wave can be reduced.

Fourth Status

The solid-state laser apparatus of the fourth status has a structure in which a microlens made by the optical glass material is focused on the end surface of the laser crystal at the side of the exciting semiconductor laser described in the first, second and third statuses.

The curvature rate of the microlens is designed and disposed (formed) such that the exciting semiconductor laser light is focused on the center portion of the laser crystal, in consideration of the thickness of the lens basic board and the beam quality of the semiconductor laser. The operation of the solid-state laser apparatus is almost same as in the case of the first, second and third statuses.

Fifth Status

Although the structure of the solid-state laser apparatus of the fifth status is almost same as that of the fourth status, the difference between the fifth status and the first through fourth statuses is that, in the fifth status, the microlens is treated with the dielectric coating substance, and an optical resonator can be formed by the end surface of the microlens and the end surface of the non-linear optical crystal by setting the reflection coefficient of the lens surface to a high value for the laser fundamental wavelength and the laser secondary harmonic wavelength and setting the transmission coefficient also to the high value for the semiconductor laser light wavelength. As to the setting of the reflection coefficient and the transmission coefficient of the end surface at the exciting side of the laser crystal, the transmission coefficient turns out to be set to the large value for the laser fundamental wavelength, the laser two-times wavelength, and the semiconductor laser light wavelength. Furthermore, the operation of the solid-state laser apparatus of the fifth state is basically same as that of the fourth status.

Sixth Status

The solid-state laser apparatus of the sixth status has a structure in which a micromirror for outputting the laser is fixed on the end surface at the laser output side of the non-linear optical crystal for generating the secondary harmonic wave of the first, second and third statuses. In such structure, the end surface at the laser output side of the non-linear optical crystal for generating the secondary harmonic wave is set so as to have a high transmission coefficient both for the laser fundamental wavelength and the secondary harmonic wavelength by treating with the dielectric substance.

Furthermore, the reflection coefficient of the micromirror is set to the high value for the laser fundamental wavelength and the transmission coefficient thereof is also set to the high value for the secondary harmonic wave by treating with the dielectric coating substance. Although the operation of the solid-state laser apparatus of the sixth status is basically same as that of the first, second and third statuses, since the laser resonator is formed with the exciting-side end surface of the laser crystal and the micromirror on this occasion, the laser oscillation turns out to be caused by the above-mentioned resonator.

Seventh Status

The solid-state laser apparatus of the seventh status has the structure in which a cavity at least having the square cross-section capable of transmitting the laser light is provided on the fixing surface to be attached to the microlens, the laser crystal of the micromirror, and the non-linear optical crystal for generating the secondary harmonic wave of the fourth, fifth and sixth statuses. On that occasion, the laser resonator is constructed with the end surface at the exciting side of the laser crystal and the micromirror, as in the case of the fifth and sixth. The reflection coefficient thereof is set and constructed in the same way as that of the fifth and sixth statuses. The operation thereof is same as that of the fifth and sixth statuses.

These and other objects are accomplished with a device and method according to the present invention, features of which are summarized below in first to seventh statuses of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

First Embodiment

Figure 1:
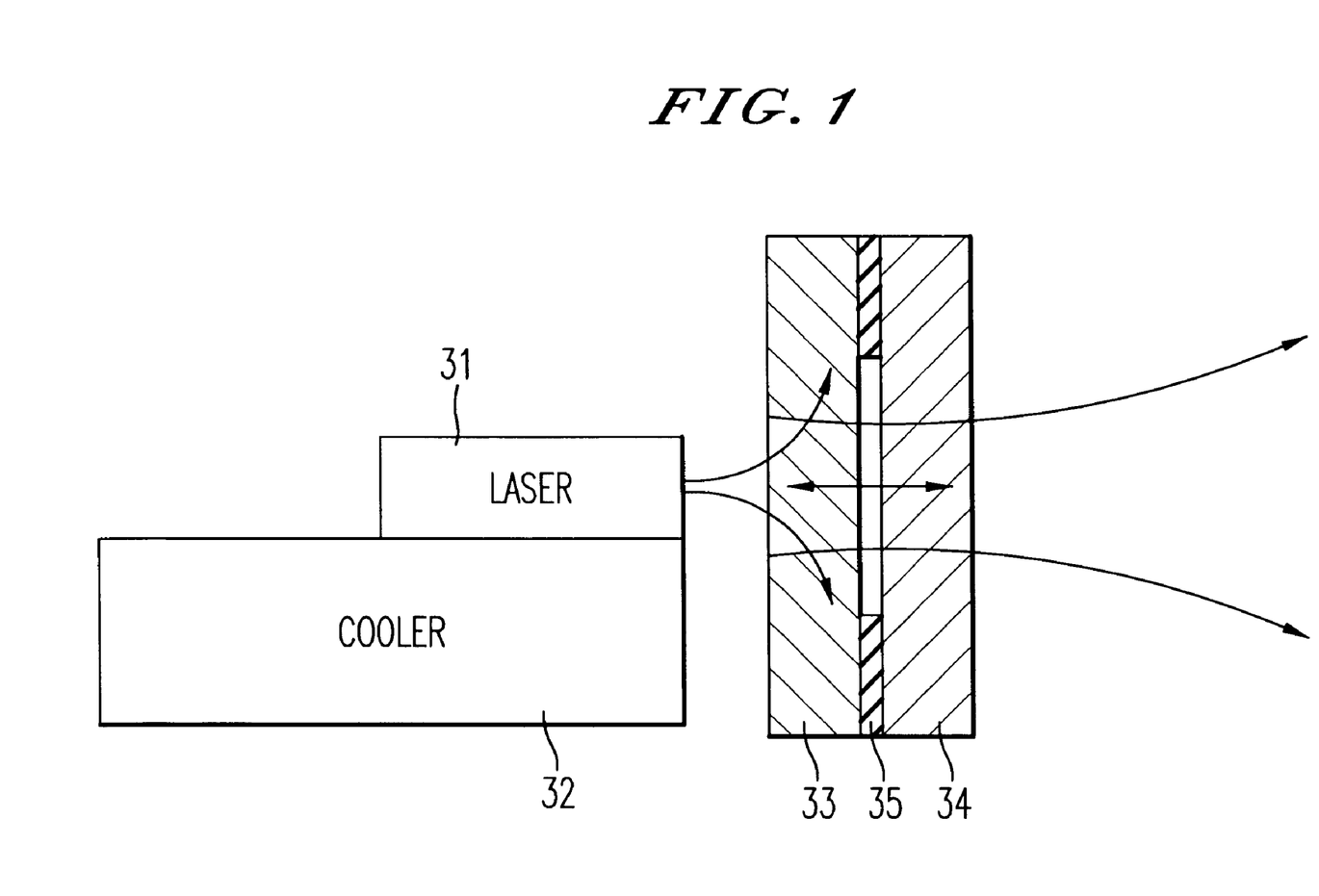
FIG. 1 is a cross-sectional view showing the main structural part of first embodiment according to the present invention.

FIG. 1 is a cross-sectional view showing the main structural part of the first embodiment of the present invention as described in the first and second statuses. The solid-state laser apparatus shown in FIG. 1 is constructed with an exciting semiconductor laser 31, a T-E cooler 32 for cooling the semiconductor laser, a laser crystal 33, and a non-linear optical crystal 34 for generating the secondary harmonic wave.

Hereupon, the laser crystal 33 and the non-linear optical crystal 34 for generating the secondary harmonic wave are unitarily combined by way of an adhesive spacer 35. Regarding the arrangement of the above-mentioned elements, the exciting semiconductor laser 31, the laser crystal 33, and the non-linear optical crystal 34 for generating the secondary harmonic wave arc arranged in this order with respect to the semiconductor laser 31.

Next, the respective structural parts are explained, hereinafter, in detail.

A semiconductor laser with 1 W maximum output is employed as the exciting semiconductor laser 31. The wavelength at the center of the emitted light is 809 nm at room (ambient) temperature. A GaAs/AlGaAs system substance is used for the semiconductor laser.

Hereupon, since the wavelength of the semiconductor laser light emitted from the semiconductor laser 31 at the center thereof depends on the temperature of the elements, the T-E cooler 32 is used for the purpose of cooling. The wavelength at the center of the emitted light is adjusted so as to equalize to the absorption wavelength of the laser crystal 33. The size of the emitted light is 1×50 µm. The semiconductor laser 31 is disposed adjacently to the laser crystal, without passing through the optical system, and the exciting operation is performed. The distance between the laser crystal 33 and the semiconductor laser 31 is about 100 µm. The excitement of the laser crystal 33 is performed utilizing the part in which the semiconductor laser light becomes almost circular.

The laser crystal 33 employs a YVO4 crystal having 1.0% Nd added thereto. Regarding the size of the laser crystal 33, the thickness thereof in the light propagating direction is 1 mm and the aperture size is 3×3 mm$^2$. The Nd: YVO4 crystal is a uniaxial crystal. The cross-section for stimulated emission in the c-axis direction is large, and thereby the linear polarizing oscillation in the c-axis direction can be realized. The end surface thereof at the exciting side is treated with a dielectric substance multiple layer coating, and thereby the transmission coefficient is set to almost 98% for the exciting wavelength of 809 nm, the reflection coefficient is set to near 99.9% for a laser fundamental wavelength of 1,064 nm, and the reflection coefficient is set to near 98% for a secondary harmonic wavelength of 532 nm.

Furthermore, the surface adjacent to the non-linear optical crystal 34 for generating the secondary harmonic wave is not treated with the dielectric substance multiple layer coating. The reflection/transmission coefficient is set by one of the Fresnel reflection for the laser fundamental wavelength of 1,064 nm and the secondary harmonic wavelength of 532 nm.

The non-linear optical crystal 34 for generating the secondary harmonic wave employs a KTP (KTiPO4) crystal. Regarding the size of the laser crystal 33, the thickness thereof in the light propagating direction is 1 mm and the aperture size is 3×3 mm$^2$. In order to obtain a type II phase matching of the laser fundamental wavelength of 1,064 nm, the KTP crystal is cut on the condition of θ=90°, and Φ=23.4°. Furthermore, as to the arrangement of the crystal, the c-axis of the KTP crystal is inclined by 45° from the c-axis of the Nd:YVO4 crystal in order to obtain the type II phase matching. Both end surfaces of the KTP crystal are treated with the dielectric substance multiple layer coating. The end surface at the side adjacent to the laser crystal 33 is set such that the transmission coefficient is near 99.5% for the laser fundamental wavelength of 1,064 nm and the secondary harmonic wavelength of 532 nm. On the other hand, the other end surface of the KTP crystal at the side of the laser output is set such that the reflection coefficient is near 99.9% for the laser fundamental wavelength of 1,064 nm and the transmission coefficient is near 95% for the secondary harmonic wavelength of 532 nm.

The laser crystal 33 is bonded to the non-linear optical crystal 34 by use of the adhesive agent capable of transmitting the light. A glass plate has a square measure of 3×3 mm$^2$, and a thickness of 0.1 mm, and a hole of almost 2 mm in diameter bored at the center thereof is employed as the spacer 35. In such structure, adhesive agent does not exist in the laser resonator, and thereby it is possible to eliminate the deterioration of the laser property itself without suffering from the internal loss of the resonator.

In the aforementioned small-sized solid-state laser apparatus, the exciting semiconductor laser light is radiated onto the laser crystal 33 as an incident light, and thereby the light at the wavelength of 1,064 nm is emitted from the laser crystal 33. By constructing such an optical (light) resonator, the inductive discharging is selectively caused. In such way, the oscillation of the laser fundamental wave is preformed.

Hereupon, the solid-state laser apparatus is constructed such that the non-linear optical crystal 34 for generating the secondary harmonic wave is disposed with the phase matching angle in the interior of the resonator, and the reflection coefficient of the resonator mirror is made as high as possible for the laser fundamental wavelength, so that the laser fundamental wave is shut up (or contained) in the interior of the resonator.

In such a structure, utilizing the high light intensity of the laser fundamental wave existing the interior of the resonator, the conversion to the secondary harmonic wave can be done by use of the non-linear optical crystal 34. Consequently, the conversion efficiency can be made higher than the case of disposing the non-linear optical crystal for generating the secondary harmonic wave in the exterior of the resonator.

Here, in the above-mentioned small-sized solid-state laser apparatus, the laser crystal 33 and the non-linear optical crystal 34 for generating the secondary harmonic wave are unitarily combined, and an optical resonator is constructed at the both ends thereof. A spacer 35 is employed on the adhesive surface thereof and a cavity is formed only in the portion for causing the laser light to pass therethrough. Furthermore, the end surface of the laser crystal is constructed only with the portion treated by optical polishing. Since the laser crystal and the non-linear optical crystal for generating the secondary wave arc unitarily combined and the optical resonator is constructed at the both ends of the laser crystal, the alignment between the crystals is not needed and the assembling process is thus simplified.

The spacer is used on the adhering surface and there exists a cavity only in the portion through which the laser light passes. The end surface of the laser crystal is processed only by optical polishing. In such structure, the Fresnel reflection occurs due to the difference of the refraction coefficient on the end surface of the laser crystal treated with the optical polishing, and further, the solid-state laser apparatus adopts the structure in which a mirror is disposed in the central portion of the optical resonator to be constructed. The distance of the free spectrum prescribed by the resonator length is the least (lowest) common multiple of the free spectrum range of two couples of the resonator, and the tolerable lengthwise mode distance becomes large. Consequently, the line number of the longitudinal mode is reduced in comparison with the case of the optical resonator having two mirrors, and thereby the longitudinal mode quality is improved. In addition, the efficiency of the conversion to the secondary harmonic wave is enlarged and the overall efficiency of the solid-state laser apparatus becomes large.

Second Embodiment

Figure 2:
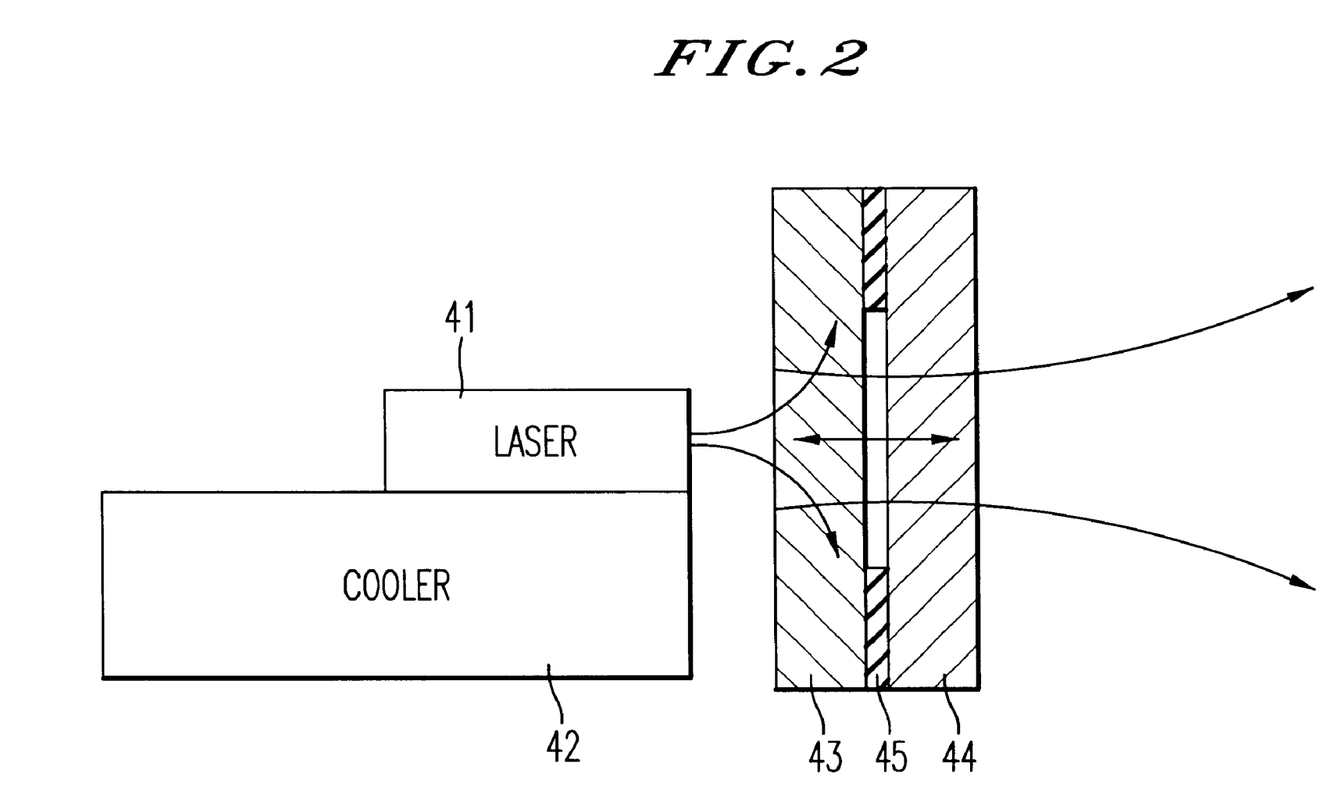
FIG. 2 is a cross-sectional view showing the main structural part of second embodiment according to the present invention.

FIG. 2 is a cross-sectional view showing the main structural part of the second embodiment according to the present invention as described in the third status. The solid-state laser apparatus shown in FIG. 2 is constructed with an exciting semiconductor laser 41, a T-E cooler 42 for cooling the semiconductor laser, a laser crystal 43, and a non-linear optical crystal 44 for generating the secondary harmonic wave. Here, the laser crystal 43 and the non-linear optical crystal 44 for generating the secondary harmonic wave are unitarily combined by use of the adhesive spacer 45.

Regarding the arrangement thereof, the exciting semiconductor laser 41, the laser crystal 43, and the non-linear optical crystal 44 for generating the secondary harmonic wave are arranged in this order with respect to the exciting semiconductor laser.

Next, the parts for constructing the solid-state laser apparatus are described, in detail, hereinafter.

A semiconductor laser of 1 W maximum power is employed as the exciting semiconductor laser 41. The wavelength at the center of the emitted light is 809 nm at room temperature. In the semiconductor laser, a GaAs/AlGaAs system substance is employed.

Hereupon, since the wavelength of the semiconductor laser light emitted from the semiconductor laser 41 at the center thereof depends on the temperature of the element, the T-E cooler 42 is used for cooling. The wavelength at the center of the emitted light is adjusted so as to equalize it to the absorption wavelength of the laser crystal 43. The size of the emitted light is 1×50 $\mu$m. The semiconductor laser 41 is disposed adjacent to the laser crystal without passing through the optical system and thus the exciting operation is performed. The distance between the laser crystal 43 and the semiconductor laser 41 is near 100 $\mu$m. The excitement of the laser crystal 43 is performed utilizing the part in which the semiconductor laser light becomes almost circular.

The laser crystal 43 employs a YVO4 crystal having 2.0% Nd added thereto. Regarding the size of the laser crystal 43, the thickness thereof in the light propagating direction is 0.5 mm and the aperture size is 3×3 mm$^2$. The Nd:YVO4 crystal is a uniaxial crystal. The cross section for stimulated emission in the c-axis direction is large, and thereby the linear polarizing oscillation in the c-axis direction can be realized. The end surface thereof at the exciting side is treated with the dielectric substance multiple layer coating, and thereby the transmission coefficient is set to near 98% for the exciting wavelength of 809 nm, the reflection coefficient is set to near 99.9% for the laser fundamental wavelength of 1,064 nm, and the reflection coefficient is set to near 98% for the secondary harmonic wavelength of 532 nm.

Furthermore, the surface adjacent to the non-linear optical crystal 44 for generating the secondary harmonic wave is treated with the dielectric substance multiple layer coating, and thereby the surface is set such that the reflection coefficient is near 30% for the laser fundamental wavelength 1,064 nm and the transmission coefficient is near 99.9% for the secondary harmonic wavelength of 532 nm.

The non-linear optical crystal 44 for generating the secondary harmonic wave employs a KTP (KTiPO4) crystal. Regarding the size of the laser crystal 43, the thickness thereof in the light propagating direction is 1 mm and the aperture size is 3×3 mm$^2$. In order to obtain the type II phase matching of the laser fundamental wavelength of 1,064 nm, the KTP crystal is cut on the condition of $\theta$=90°, and $\Phi$=23.4°. Furthermore, as to the arrangement of the crystal, the c-axis of the KTP crystal is inclined by 45° from the c-axis of the Nd:YVO4 crystal in order to obtain the type II phase matching. Both end surfaces of the KTP crystal are treated with the dielectric substance multiple layer coating. The end surface at the side adjacent to the laser crystal 43 is set such that the transmission coefficient is near 99.5% for the laser fundamental wavelength 1,064 nm and the secondary harmonic wavelength of 532 nm. On the other hand, the other end surface of the KTP crystal at the side of the laser output is set such that the reflection coefficient is near 99.9% for the laser fundamental wavelength of 1,064 nm and the transmission coefficient is near 95% for the secondary harmonic wavelength of 532 nm.

The laser crystal 43 is bonded to the non-linear optical crystal 44 by use of an adhesive agent capable of transmitting light. A glass plate having a square measure of 3×3 mm$^2$ and a thickness of 0.1 mm and having a hole of almost 2 mm in diameter bored at the center thereof is employed as the spacer 45. In such structure, the adhesive agent does not exist in the laser resonator, and thereby it is possible to eliminate the deterioration of the laser property itself without suffering from the internal loss of the resonator. In the aforementioned small-sized solid-state laser apparatus, the exciting semiconductor laser light is radiated onto the laser crystal 43 as the incident light, and thereby the light of the wavelength 1,064 nm is emitted from the laser crystal 43. By constructing such an optical (light) resonator, inductive discharging is selectively caused. In such way, oscillation of the laser fundamental wave is performed.

Hereupon, the non-linear optical crystal 44 for generating the secondary harmonic wave is disposed in the interior of the resonator with the phase matching angle, and the reflection coefficient of the resonator mirror is made as high as possible for the laser fundamental wavelength. In such structure, the laser fundamental wave is contained in the interior of the resonator. Thereby, utilizing the high light intensity of the laser fundamental wave existing in the resonator, the conversion to the secondary harmonic wave can be performed by use of the non-linear optical crystal. Consequently, the conversion efficiency can be raised compared with the case of disposing the non-linear optical crystal for generating the secondary harmonic wave in the exterior of the resonator.

Here, in the above-mentioned small-sized solid-state laser apparatus, the laser crystal 43 and the non-linear optical crystal 44 for generating the secondary harmonic wave are unitarily combined, and an optical resonator is constructed at both ends thereof A spacer 45 is employed on the adhesive surface thereof and a cavity is formed only in the portion for causing the laser light to pass therethrough. Furthermore, the end surface of the laser crystal has a partial reflection coefficient. The laser crystal 43 and the non-linear optical crystal 44 for generating the secondary harmonic wave are unitarily combined, and the both ends thereof construct the optical resonator. In such structure, the alignment between the crystals becomes not necessary and the subsequent assembling process can be simplified.

Furthermore, the spacer 45 is employed on the adhesive surface and the cavity is provided only in the portion where the laser light passes through, and the end surface of the laser crystal is set so as to have the partial reflection coefficient of almost 30% for the laser fundamental wave. Thereby, the solid-state laser apparatus has a structure in which a mirror is disposed near the central part of the optical resonator to be constructed, and the distance of the free spectrum range prescribed by the resonator's length turns out to be the least (lowest) common multiple of the free spectrum distance of two couples of resonators. Thereby, the tolerable longitudinal mode distance becomes large. Consequently, the line number of the longitudinal mode is reduced. As the result, not only the quality of the longitudinal mode is improved, but the efficiency of the conversion to the secondary harmonic wave is enlarged, and thereby the overall efficiency is also enlarged.

Third Embodiment

Figure 3:
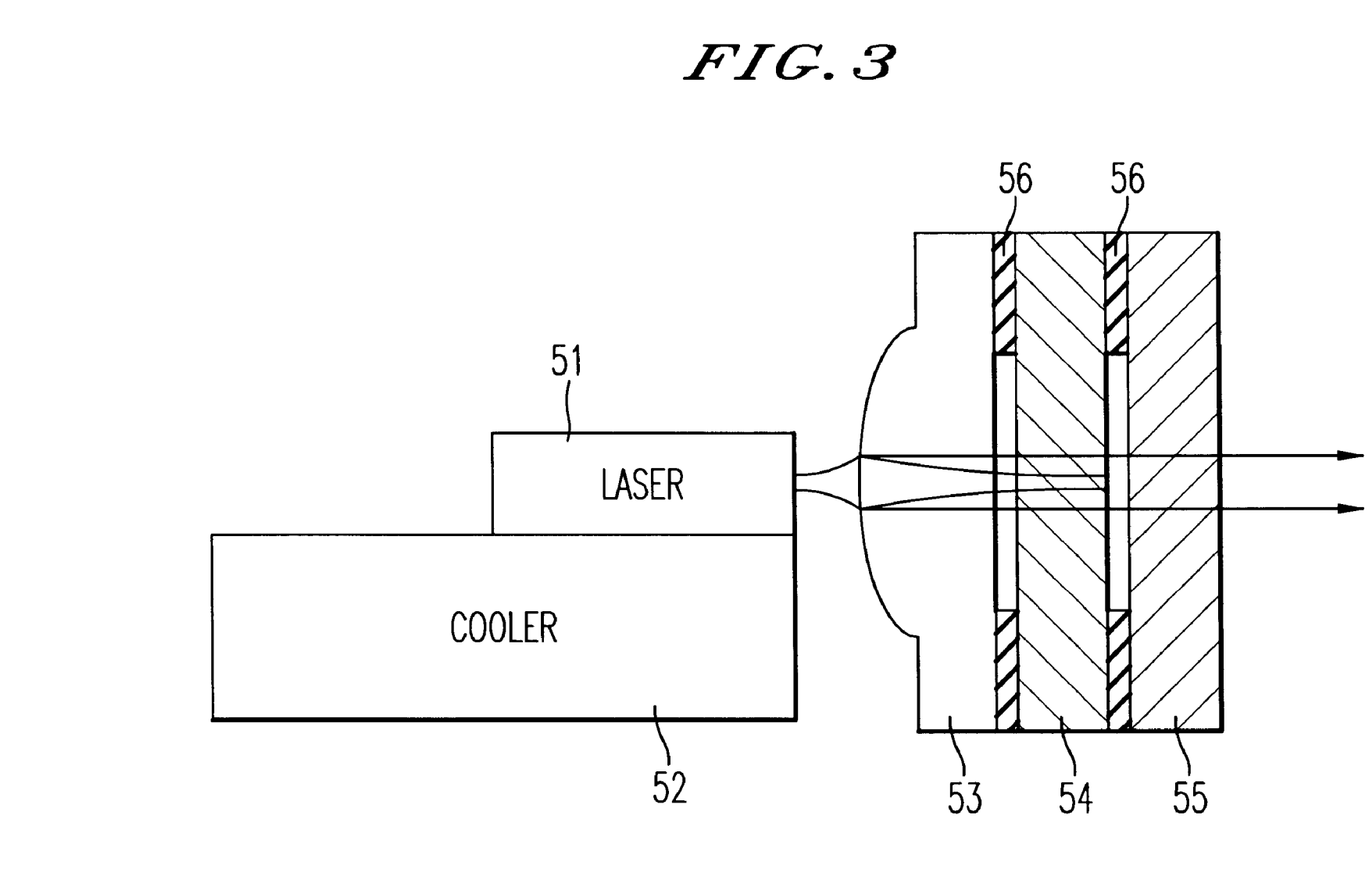
FIG. 3 is a cross-sectional view showing the main structural part of third embodiment according to the present invention.

FIG. 3 is a cross-sectional view showing the main structural part of the third embodiment according to the present invention as described in the fourth and fifth statuses. The solid-state laser apparatus shown in FIG. 3 is constructed with an exciting semiconductor laser 51, a T-E cooler 52 for cooling the semiconductor laser, a microlens 53, a laser crystal 54, and a non-linear optical crystal 55 for generating the secondary harmonic wave.

Hereupon, the microlens 53 and the laser crystal 54, and the laser crystal 54 and the non-linear optical crystal 55 for generating the secondary harmonic wave are, respectively, unitarily combined by use of an adhesive spacers 56. Regarding the arrangement of the above-mentioned elements, the exciting semiconductor laser 51, the microlens 53, the laser crystal 54, and the non-linear optical crystal 55 for generating the secondary harmonic wave are arranged in this order with respect to the semiconductor laser 51.

Next, the respective structural parts are explained, hereinafter, in detail. A semiconductor laser 1 W maximum output is employed as the exciting semiconductor laser 51. The wavelength at the center of the emitted light is 809 nm at room (ambient) temperature. A GaAs/AlGaAs system substance is used for the semiconductor laser.

Hereupon, since the wavelength of the semiconductor laser light emitted from the semiconductor laser 51 depends on the temperature of the elements, the T-E cooler 52 is used for the purpose of cooling. The wavelength at the center of the emitted light is adjusted so as to equalize it to the absorption wavelength of the laser crystal 54. The size of the emitted light is 1×50 $\mu$m. The light is focused by the microlens 53 described below and directed onto the semiconductor laser crystal 54 as the incident light. The distance between the microlens 53 and the laser crystal 54 is 100 $\mu$m. In such structure, the semiconductor laser light is focused at or substantially on the center position of the laser crystal 54.

The microlens 53 is made in such way as discussed below. An optical glass material of about 1 mm in thickness is treated with a photolithographic process and etching process. The convex surface having a curvature radius of 180 $\mu$m is formed on the microlens 53 in the direction that the semiconductor lens 51 spreads out at an extending angle, the convex surface having a curvature radius of 150 $\mu$m is formed thereon in the direction of narrowing the extending angle of the light from the semiconductor laser 51. By forming the microlens 53 in such a shape, the semiconductor laser light becomes almost circular at the center of the laser crystal, and thereby a substantially circular output light can be obtained. Furthermore, the surface of the lens 53 is treated with the dielectric substance multiple layer film coating. The surface of the lens 53 at the side of the semiconductor laser 51 is set such that the reflection coefficient becomes 99.9% for both of the laser fundamental wave and the laser secondary harmonic wave and the transmission coefficient becomes 98% for the semiconductor laser light. Furthermore, the surface of the lens 53 at the side of the laser crystal 54 is set such that the transmission coefficient becomes 99.9% for all of the laser fundamental wave, the laser two-times wave, and the semiconductor laser light. By setting the reflection coefficient and the transmission coefficient in such a manner, the microlens 53 can satisfy (execute) both functions as the lens for focusing the semiconductor laser light and the optical resonator mirror.

The laser crystal 54 employs a YVO4 crystal having 2.0%Nd added thereto. Regarding the size of the laser crystal 33, the thickness thereof in the light propagating direction is 0.5 mm and the aperture size is 3×3 mm². The Nd:YVO4 crystal is a uniaxial crystal. The cross section for stimulated emission in the c-axis direction is large, and thereby the linear polarizing oscillation in the c-axis direction can be realized. The end surface thereof at the exciting side is treated with the dielectric substance multiple layer coating, and thereby the transmission coefficient is set to near 98% for the exciting wavelength of 809 nm, the reflection coefficient is set to near 30% for the laser fundamental wavelength of 1,064 nm, and the transmission coefficient is set to near 98% for the secondary harmonic wavelength of 532 nm.

Furthermore, the surface adjacent to the non-linear optical crystal 55 for generating the secondary harmonic wave is treated with the dielectric substance multiple layer coating, and the surface is set such that the reflection coefficient is near 98% for the exciting wavelength of 809 nm, the reflection coefficient is near 30% for the laser fundamental wavelength of 1,064 nm, and the transmission coefficient is near 98% for the secondary harmonic wavelength of 532 nm.

The non-linear optical crystal 55 for generating the secondary harmonic wave employs a KTP (KTiPO4) crystal. Regarding the size of the laser crystal 54, the thickness thereof in the light propagating direction is 1 mm and the aperture size is 3×3 mm². In order to obtain the type II phase matching of the laser fundamental wavelength of 1,064 nm, the KTP crystal is cut on the condition of $\theta=90°$, and $\Phi=23.4°$. Furthermore, as to the arrangement of the crystal, the c-axis of the KTP crystal is inclined by 45° from the c-axis of the Nd:YVO4 crystal in order to obtain the type II phase matching. Both end surfaces of the KTP crystal are treated with the dielectric substance multiple layer coating. The end surface at the side adjacent to the laser crystal 54 is set such that the transmission coefficient is near 99.5% for the laser fundamental wavelength of 1,064 nm and the secondary harmonic wavelength of 532 nm. On the other hand, the other end surface of the KTP crystal at the side of the laser output is set such that the reflection coefficient is near 99.9% for the laser fundamental wavelength of 1,064 nm and the transmission coefficient is near 95% for the secondary harmonic wavelength of 532 nm.

The laser crystal 54 is bonded to the non-linear optical crystal 55 by use of the adhesive agent capable of transmitting the light. A glass plate having a square measure of 3×3 mm², a thickness of 0.1 mm and a hole near 2 mm in diameter bored at the center thereof is employed as the spacer 56. In such structure, the adhesive agent does not exist in the laser resonator, and thereby it is possible to eliminate the deterioration of the laser property itself without suffering from the internal loss of the resonator.

In the aforementioned small-sized solid-state laser apparatus, the exciting semiconductor laser light is radiated onto the laser crystal 54 as the incident light, and thereby the fluorescent light of the wavelength of 1,064 nm is emitted from the laser crystal 54. By constructing such optical (light) resonator, the inductive discharging is selectively caused. In such way, the oscillation of the laser fundamental wave is performed.

Hereupon, the solid-state laser apparatus is constructed such that, in order to effectively direct the semiconductor laser light onto the laser crystal 54 as the incident light, an element commonly functioning as the microlens and the resonator mirror is disposed between the semiconductor laser 51 and the laser crystal 54, and thereby the laser lateral mode is improved. The non-linear optical crystal 55 for generating the secondary harmonic wave is disposed in the interior of the resonator with the phase matching angle. Furthermore, the reflection coefficient of the resonator mirror is made as high as possible for the laser fundamental wavelength and the laser fundamental wave is contained in the interior of the resonator. In such structure, utilizing the high light intensity of the laser fundamental wave existing in the interior of the resonator, the conversion to the secondary harmonic wave can be performed by use of the non-linear optical crystal. Consequently, the conversion efficiency can be further raised as compared with the case of disposing the non-linear optical crystal for generating the secondary harmonic wave exterior to the resonator.

Here, in the above-mentioned small-sized solid-state laser apparatus, the microlens/resonator mirror 53, the laser crystal 54, and the non-linear optical crystal 55 for generating the secondary harmonic wave are unitarily combined, and an optical resonator is constructed by the surface of the microlens 53 at the side of the semiconductor laser 51 and the end surface at the laser light outputting side of the non-linear optical crystal 55 for generating the secondary harmonic wave. A spacer 56 is employed on the respective adhesive surfaces and a cavity is formed only in the portion for causing the laser light to pass therethrough.

Since the microlens/resonator mirror, the laser crystal, and the non-linear optical crystal for generating the secondary wave are unitarily combined, and the optical resonator is constructed by the surface of the microlens 53 at the side of the semiconductor laser 51 and the end surface at the laser light outputting side of the non-linear optical crystal 55 for generating the secondary harmonic wave, the alignment between the crystals or the alignment of the optical system is not needed and the assembling process thereafter is simplified.

Furthermore, the spacer 56 is used on the adhering surface and there exists a cavity only in the portion through which the laser light passes. The end surface of the laser crystal is provided with the partial reflection coefficient, and its structure becomes equivalent to the one in which the etalon is disposed on the center portion of the constructed optical resonator. The distance of the free spectrum range prescribed by the resonator's length turns out to be the least (lowest) common multiple of the free spectrum distance of two couples of resonators. Thereby, the tolerable lateral mode distance is enlarged. Furthermore, the line number of the longitudinal mode is reduced and the quality of the longitudinal mode is improved, as compared with the case of employing the optical resonator with two mirror sheets. In addition, the efficiency of the conversion to the secondary harmonic wave is enlarged, and the overall efficiency is also enlarged.

Fourth Embodiment

Figure 4:
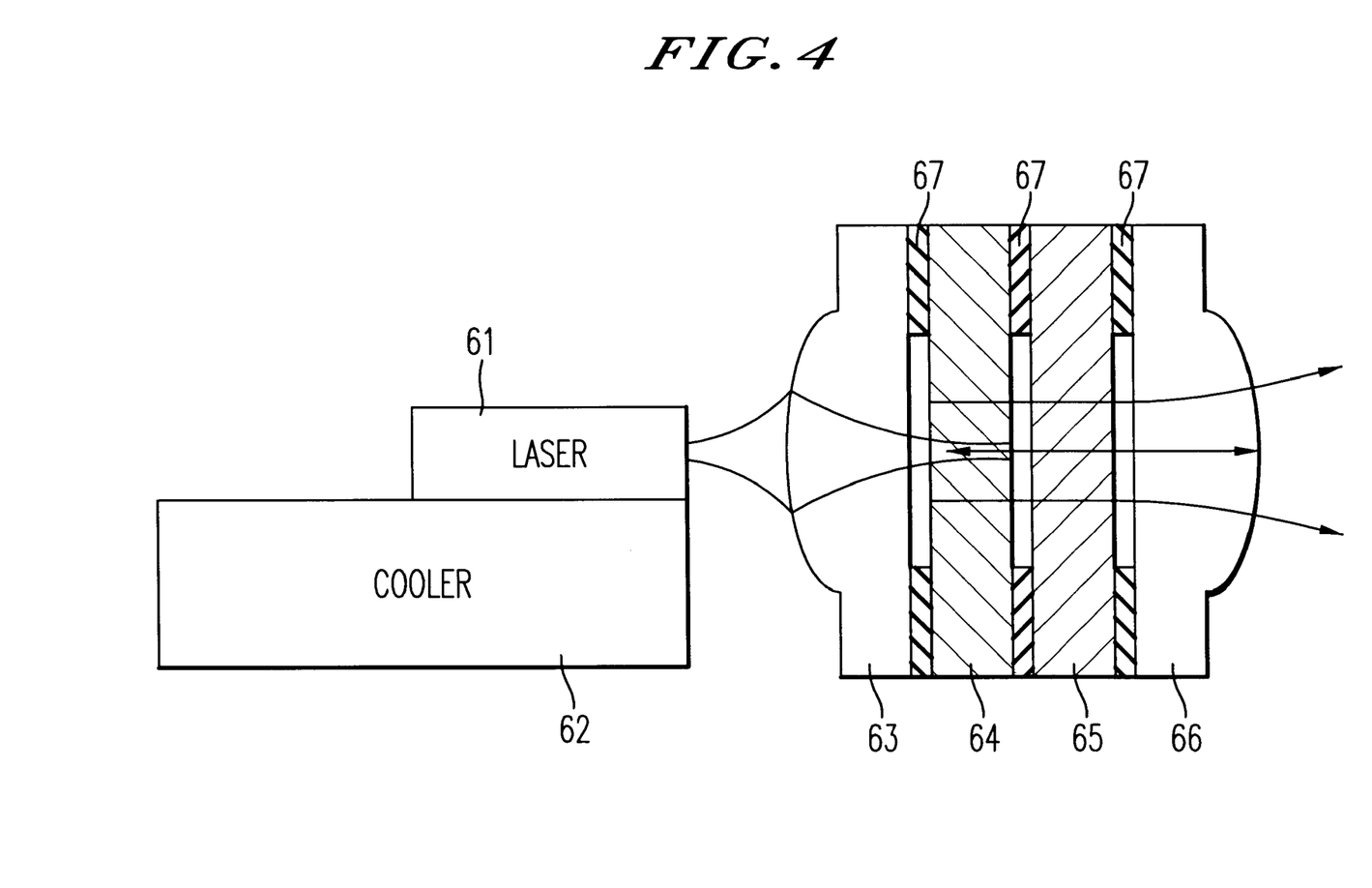
FIG. 4 is a cross-sectional view showing the main structural part of fourth embodiment according to the present invention.

FIG. 4 is a cross-sectional view showing the main structural part of the fourth embodiment according to the present invention as described in the sixth and seventh statuses. The solid-state laser apparatus shown in FIG. 4 is constructed with an exciting semiconductor laser 61, a T-E cooler 62 for cooling the semiconductor laser 61, a microlens 63, a laser crystal 64, a non-linear optical crystal 65 for generating the secondary harmonic wave, and an output micromirror 66.

Hereupon, the microlens 63 and the laser crystal 64, the laser crystal 64 and the non-linear optical crystal 65 for generating the secondary harmonic wave, and the non-linear optical crystal 65 and the output micromirror 66 are respectively unitarily combined by use of an adhesive spacers 67. Regarding the arrangement of the above-mentioned elements, the exciting semiconductor laser 61, the microlens 63, the laser crystal 64, and the non-linear optical crystal 65 for generating the secondary harmonic wave, and the output micromirror 66 are arranged in this order with respect to the semiconductor laser 61.

Next, the respective structural parts are explained, hereinafter, in detail.

A semiconductor laser with 1 W maximum output is employed as the exciting semiconductor laser 61. The wavelength at the center of the emitted light is 809 nm at room (ambient) temperature. A GaAs/AlGaAs system substance is used for the semiconductor laser.

Hereupon, since the wavelength of the semiconductor laser light emitted from the semiconductor laser 61 at the center thereof depends on the temperature of the elements, the T-E cooler 62 is used for the purpose of cooling. The wavelength at the center of the emitted light is adjusted so as to equalize it to the absorption wavelength of the laser crystal 64. The size of the emitted light is 1×50 $\mu$m. The semiconductor laser light is focused by the microlens 63 as described below and directed onto the laser crystal 64 as the incident light. The distance between the microlens and the semiconductor laser crystal 64 is about 100 $\mu$m. In such a structure, the semiconductor laser light can be focused new or substantially on the center position of the laser crystal 64.

The microlens 63 is made in such a way as mentioned below. An optical glass material of near 1 mm in thickness used is treated with a photolithographic process and etching process. The convex surface having a curvature radius 180 $\mu$m is formed on the microlens 63 in the direction that the light from the semiconductor laser 61 spreads out at an extending angle, and the other convex surface having a curvature radius of 150 $\mu$m is formed thereon in the direction of narrowing the extending angle of the light from the semiconductor laser 61. By forming the microlens 63 in such a shape, the semiconductor laser light becomes almost circular at the center of the laser crystal 64, and thereby a substantially circular output light can be obtained. Furthermore, the surfaces of the lens 63 are treated with the dielectric substance multiple layer film coating. Both end surfaces thereof are set such that the transmission coefficient becomes 98% for the semiconductor laser light of the wavelength of 809 nm.

The laser crystal 64 employs a YVO4 crystal having 1.0% Nd added thereto. Regarding the size of the laser crystal 64, the thickness thereof in the light propagating direction is 0.5 mm and the aperture size is 3×3 mm$^2$. The Nd:YVO4 crystal is a uniaxial crystal. The cross section for stimulated emission in the c-axis direction is large, and thereby the linear polarizing oscillation in the c-axis direction can be realized. The end surface thereof at the exciting side is treated with the dielectric substance multiple layer coating, and thereby the transmission coefficient is set to near 98% for the exciting wavelength of 809 nm, the reflection coefficient is set to near 99.9% for the laser fundamental wavelength of 1,064 nm, and the reflection coefficient is set to near 98% for the secondary harmonic wavelength of 532 nm.

Furthermore, the surface adjacent to the non-linear optical crystal 65 for generating the secondary harmonic wave is treated with the dielectric substance multiple layer coating, and the surface is set such that the reflection coefficient is near 10% for the laser fundamental wavelength of 1,064 nm, the transmission coefficient is near 98% for the secondary harmonic wavelength of 532 nm, and the reflection coefficient is near 99% for the exciting wavelength of 809 nm. In particular, regarding the exciting wavelength, it is possible to absorb the semiconductor laser light directed back and forth through the laser crystal by performing the coating treatment and thus the thickness of the crystal can be made even thinner.

The non-linear optical crystal 65 for generating the secondary harmonic wave employs KTP (KTiPO4) crystal. Regarding the size of the laser crystal 64, the thickness thereof in the light propagating direction is 1 mm and the aperture size is 3×3 mm$^2$. In order to obtain the type II phase matching of the laser fundamental wavelength of 1,064 nm, the KTP crystal is cut on the condition of θ=90°, and ψ=23.4°. Furthermore, as to the arrangement of the crystal, the c-axis of the KTP crystal is inclined by 45° from the c-axis of the Nd:YVO4 crystal in order to obtain the type II phase matching. Both end surfaces of the KTP crystal are treated with the dielectric substance multiple layer coating, and are set such that the transmission coefficient is near 99.5% both for the laser fundamental wavelength of 1,064 nm and for the secondary harmonic wavelength of 532 nm.

Regarding the output micromirror 66, a convex surface is formed on the surface of the micromirror 66. An optical glass basic plate of almost 1 mm in thickness is treated by optically polishing its surface to form the output micromirror 66. The curvature radius of the formed convex surface is made equal to the resonator's length, 6 mm, by a photolithographic process and an etching process. The size of its aperture is 3×3 mm$^2$ as in the case of the optical crystal. The end surface of the output micromirror at the side of outputting the laser light, that is, the convex surface is treated with the dielectric substance multiple layer film coating, and the surface is set such that the surface has the reflection coefficient of near 99.9% for the laser fundamental wavelength, and has the transmission coefficient of near 98% for the secondary harmonic wavelength. Furthermore, the end surface thereof adjacent to the non-linear optical crystal 65 for generating the secondary harmonic wave is treated with the dielectric substance multiple layer film coating, and thereby the surface has a transmission coefficient of near 99% both for the laser fundamental wavelength and for the secondary harmonic wavelength. Consequently, the micromirror 66 jointly (commonly) performs the function as the output mirror.

Furthermore, light-transmitting adhesive agent is employed for bonding the microlens 63 and the laser crystal 64, the laser crystal 64 and the non-linear optical crystal 65 for generating the secondary harmonic wave, and the non-linear optical crystal 65 and the output micromirror 66. The glass plate having a square measure of 3×3 mm$^2$, thickness near 0.1 mm, and a hole near 2 mm diameter bored on the center thereof is employed as the spacer 67. In such structure, there exists no adhesive agent in the portion where the light passes through. Therefore, the solid-state laser apparatus is not adversely affected by the absorption loss and thereby the apparatus can be unitarily combined.

In the above small-sized solid-state laser apparatus, the exciting semiconductor laser light is directed onto the laser crystal as the incident light. Thereby, the light of the wavelength 1,064 nm emitted from the laser crystal is selectively induced and discharged by the constructed optical resonator. In such way, the oscillation of the laser fundamental wave can be caused. Here, the non-linear optical crystal for generating the secondary harmonic wave is disposed in the interior of the resonator with the phase matching angle. Furthermore, the reflection coefficient of the resonator mirror is made as high as possible for the laser fundamental wavelength and the laser fundamental wave is contained in the resonator.

In such structure as mentioned heretofore, utilizing the high light intensity of the laser fundamental wave existing in the resonator, the conversion to the secondary harmonic wave due to the non-linear optical crystal can be performed. For this reason, the conversion efficiency can be raised, as compared with the case of disposing the non-linear optical crystal for generating the secondary harmonic wave in the exterior to the resonator.

Here, the above small-sized solid-state laser apparatus is featured in that the laser crystal 64, the non-linear optical crystal 65 for generating the secondary harmonic wave, the exciting light focusing lens 63, and the output mirror 66 are unitarily combined. The spacer 67 is employed on the adhering surfaces thereof. There is provided a cavity only in the portion where the laser light passes through. The surface thereof is treated with the dielectric substance coating such that the loss due to the light absorption is suppressed and the end surface of the laser crystal adjacent to the non-linear optical crystal is controlled so as to have the reflection coefficient of near 10% for the laser fundamental wavelength. The above is the feature of the solid-state laser apparatus of the fourth embodiment. All of the laser crystal 64, the non-linear optical crystal 65 for generating the secondary harmonic wave, the exciting light focusing lens 63, and the output mirror 65 are unitarily combined. Consequently, the alignment between the crystals becomes unnecessary, and thereby the subsequent assembling process can be simplified.

In the fourth embodiment, the spacer 67 is employed on the adhesive surface, a cavity is formed only in the portion where the laser light passes through, and the end surface of the laser crystal adjacent to the non-linear optical crystal for generating the secondary harmonic wave is treated with the dielectric substance coating and controlled such that the reflection coefficient becomes almost 10% for the laser fundamental wavelength. In such structure, the loss of the light absorption is reduced. A mirror is disposed almost on the center portion of the optical resonator thus constructed. In such structure, the free spectrum range distance prescribed by the resonator's length turns out to be equal to the least (lowest) common multiple, and the tolerable longitudinal mode distance becomes large. Thereby, the line number of the longitudinal mode is reduced, as compared with the case of employing the optical resonator with two mirror sheets. Consequently, not only the longitudinal mode quality is improved, but the efficiency of the conversion is raised, and the overall efficiency becomes large. Furthermore, the resonator mode can be matched (equalized) to the exciting mode, and thereby the laser lateral mode can be improved.

In the first status of the present invention, not only can the solid-state laser apparatus be made small in size, but optical alignment becomes unnecessary.

In the second status of the present invention, the solid-state laser apparatus is made small-sized, optical alignment becomes unnecessary, and in addition, the laser property (in particular, the longitudinal mode) can be improved, and thereby the conversion efficiency to the secondary harmonic wave can be raised.

In the third status of the present invention, in addition to the above-mentioned functional effects of the first and second statuses, the functional effects are further enhanced for the improvement of the laser lengthwise mode property and thereby both the laser quality and the conversion efficiency can be improved.

In the fourth status of the present invention, the shape of the exciting light is made to approximate that of the resonator mode. Furthermore, the laser quality (in particular, the lateral mode) property is improved, and thereby the efficiency of the conversion to the secondary harmonic wave is also improved. Furthermore, the alignment of the lens, etc. becomes unnecessary.

In the fifth status of the present invention, the laser lateral mode is improved, the efficiency of the conversion to the secondary harmonic wave is also improved. Consequently, not only is overall efficiency raised, but the laser lateral mode is improved.

In the sixth status of the present invention, the laser resonator becomes of semi resonance focus type and the laser quality (in particular, the lateral mode) property is improved and thereby the efficiency of the conversion to the secondary harmonic wave is also improved. Furthermore, the alignment of the output mirror, etc. becomes not necessary.

In the seventh status of the present invention, there exists no absorbing material such as the adhesive agent in the portion where the light passes through, and thereby the light loss is eliminated. Consequently, all of the exciting efficiency, the laser efficiency, and the efficiency of the conversion to the secondary harmonic wave can be prevented from being deteriorated. Further, the small-sized laser light source of small size, high efficiency, and high light beam quality can be realized without deteriorating the laser property.

Although, the embodiments (the first through fourth embodiments) of the present invention are described, in detail, heretofore, various other embodiments and the modifications thereof in relation to the above-mentioned can be applied to the invention.

The entire contents of Japanese priority document, Japanese Patent Application No. 9-079036, filed Mar. 13, 1997, is incorporated herein by reference.

What is claimed is:

1. A solid-state laser apparatus comprising:
   a laser crystal;
   a semiconductor laser configured to emit an exciting laser light and pump said laser crystal; and
   an optical resonator configured to generate a light of a laser fundamental wave, said optical resonator having an interior, including,
   said laser crystal which emits the light of the laser fundamental wave upon receiving said exciting laser light,
   a non-linear optical crystal disposed in the interior of said optical resonator and configured to generate a light of a secondary harmonic wave from the light of said laser fundamental wave,
   a spacer containing a central through hole, connecting and unitarily combining said laser crystal to said non-linear optical crystal to form an optical cavity between said laser crystal and said non-linear optical crystal, and
   an end surface interior to the optical resonator of at least one of said laser crystal and said non-linear optical crystal, configured to partially reflect the light of the laser fundamental wave,
   wherein said optical resonator generates and outputs the light of the secondary harmonic wave.

2. The solid state laser apparatus as defined in claim 1, wherein:
   a surface of said laser crystal adjacent to said non-linear optical crystal being treated with an optical polishing process to partially reflect the light of the laser fundamental wave;
   said laser crystal with treated surface being disposed facing said non-linear crystal on the interior of a light transmitting portion of said optical resonator and forming a laser resonator; and
   said cavity having a square cross-section capable of transmitting the laser light therethrough.

3. The solid-state laser apparatus as defined in claim 2, wherein:
   said laser crystal has a part formed at an end surface of the laser crystal proximate said non-linear optical crystal, said part being configured to partially reflect the light of the laser fundamental wave.

4. The solid-state laser apparatus as defined in claim 3, further comprising:
   a microlens made of optical glass material unitarily combined on an end surface of said laser crystal facing the semiconductor laser and shaped to focus the exciting laser light.

5. The solid-state laser apparatus as defined in claim 4, wherein said microlens has a coating to reflect light of the laser fundamental wave and is configured to also serve as a mirror of said laser resonator.

6. The solid-state laser apparatus as defined in claim 5, wherein:
   the cavity has a square cross-section through which said laser light passes; and
   said spacer rigidly fixes said laser and non-linear crystals to one another.

7. The solid-state laser apparatus as defined in claim 2, further comprising:
   a micromirror disposed in said optical resonator and unitarily provided on a light emitting end of said non-linear optical crystal opposite said laser crystal.

8. The solid-state laser apparatus as defined in claim 7, wherein:
   the cavity has a square cross-section through which said laser light passes; and
   said spacer rigidly fixes said laser and non-linear crystals to one another.

9. The solid-state laser apparatus as defined in claim 2, further comprising:
   a microlens made of optical glass material unitarily combined on an end surface of said laser crystal facing the semiconductor laser and shaped to focus the exciting laser light.

10. The solid-state laser apparatus as defined in claim 9, wherein said microlens has a coating to reflect light of the laser fundamental wave and is configured to also serve as a mirror of said laser resonator.

11. The solid-state laser apparatus as defined in claim 10, wherein:
    the cavity has a square cross-section through which said laser light passes; and
    said spacer rigidly fixes said laser and non-linear crystals to one another.

12. The solid-state laser apparatus as defined in claim 9, wherein:
    the cavity has a square cross-section through which said laser light passes; and
    said spacer rigidly fixes said laser and non-linear crystals to one another.

13. The solid-state laser apparatus as defined in claim 3, further comprising:
    a micromirror disposed in said optical resonator and unitarily provided on a light emitting end of said non-linear optical crystal opposite said laser crystal.

14. The solid-state laser apparatus as defined in claim 13, wherein:
    the cavity has a square cross-section through which said laser light passes; and
    said spacer rigidly fixes said laser and non-linear crystals to one another.

15. The solid-state laser apparatus as defined in claim 4, wherein:
    the cavity has a square cross-section through which said laser light passes; and said spacer rigidly fixes said laser and non-linear crystals to one another.

16. The solid-state laser apparatus as defined in claim 1, wherein:

said laser crystal has a part formed at an end surface of the laser crystal proximate said non-linear optical crystal, said part being configured to partially reflect the light of the laser fundamental wave.

17. The solid-state laser apparatus as defined in claim 3, further comprising:

a microlens made of optical glass material unitarily combined on an end surface of said laser crystal facing the semiconductor laser and shaped to focus the exciting laser light.

18. The solid-state laser apparatus as defined in claim 17, wherein said microlens has a coating to reflect light of the laser fundamental wave and is configured to also serve as a mirror of said laser resonator.

19. The solid-state laser apparatus as defined in claim 18, wherein:

the cavity has a square cross-section through which said laser light passes; and said spacer rigidly fixes said laser and non-linear crystals to one another.

20. The solid-state laser apparatus as defined in claim 17, wherein:

the cavity has a square cross-section through which said laser light passes; and said spacer rigidly fixes said laser and non-linear crystals to one another.

21. The solid-state laser apparatus as defined in claim 16, further comprising:

a micromirror disposed in said optical resonator and unitarily provided on a light emitting end of said non-linear optical crystal opposite said laser crystal.

22. The solid-state laser apparatus as defined in claim 21, wherein:

the cavity has a square cross-section through which said laser light passes; and said spacer rigidly fixes said laser and non-linear crystals to one another.

23. The solid-state laser apparatus as defined in claim 1, further comprising:

a microlens made of optical glass material unitarily combined on an end surface of said laser crystal facing the semiconductor laser and shaped to focus the exciting laser light.

24. The solid-state laser apparatus as defined in claim 23, wherein said microlens has a coating to reflect light of the laser fundamental wave and is configured to also serve as a mirror of said laser resonator.

25. The solid-state laser apparatus as defined in claim 24, wherein:

the cavity has a square cross-section through which said laser light passes; and said spacer rigidly fixes said laser and non-linear crystals to one another.

26. The solid-state laser apparatus as defined in claim 23, wherein:

the cavity has a square cross-section through which said laser light passes; and said spacer rigidly fixes said laser and non-linear crystals to one another.

27. The solid-state laser apparatus as defined in claim 1, further comprising:

a micromirror disposed in said optical resonator and unitarily provided on a light emitting end of said non-linear optical crystal opposite said laser crystal.

28. The solid-state laser apparatus as defined in claim 27, wherein:

the cavity has a square cross-section through which said laser light passes; and said spacer rigidly fixes said laser and non-linear crystals to one another.

29. A method of assembling a solid-state laser apparatus, comprising the steps of:

providing a semiconductor laser configured to emit an exciting laser light and a laser crystal configured to be pumped by said exciting laser light, forming an optical resonator for generating a light of a laser fundamental wave from said exciting laser light, said optical resonator having an interior in which the laser crystal is disposed, said laser crystal upon being pumped by said exciting laser light emitting the light of the laser fundamental wave, including the steps of, preparing an end surface interior to the optical resonator of at least one of said laser crystal and a non-linear optical crystal to partially reflect light of the laser fundamental wave, and using a spacer containing a central through hole to connect and unitarily combine the laser crystal to the non-linear optical crystal, thereby forming an optical cavity in the interior of the optical resonator between said laser crystal and said non-linear optical crystal.

30. The method of assembling a solid-state laser apparatus as defined in claim 29, further comprising the steps of:

treating a surface of said laser crystal adjacent to that of said non-linear optical crystal with an optical polishing process;

unitarily combining said laser crystal and non-linear crystal such that the surface on the laser crystal treated with optical polishing faces the non-linear optical crystal; and, respectively forming said cavity with square cross-section capable of transmitting the laser light therethrough between said laser crystal and said non-linear crystal.

31. The method of claim 30, further comprising the step of:

forming on an end surface of said laser crystal proximate said non-linear optical crystal a part capable of partially reflecting the light of the laser fundamental wave.

32. The method of claim 31 further comprising the step of:

focusing the exciting laser light with a microlens made of optical glass material on an end surface of said laser crystal at an exciting side of said laser crystal.

33. The method of claim 31, further comprising the step of:

positioning a micromirror made of optical glass material in said optical resonator on an end surface at a light emitting side of said non-linear optical crystal opposite said laser crystal.

34. The method of assembling a solid-state laser apparatus as defined in claim 31, further comprising the steps of:

forming between said laser and non-linear optical crystals a cavity of square cross-section capable of transmitting the laser light therethrough, said spacer rigidly fixing said laser and non-linear crystals to each other.

35. The method of claim 30 further comprising the step of:

focusing the exciting laser light with a microlens made of optical glass material on an end surface of said laser crystal at an exciting side of said laser crystal.

36. The method of claim 30, further comprising the step of:

positioning a micromirror made of optical glass material in said optical resonator on an end surface at a light emitting side of said non-linear optical crystal opposite said laser crystal.

37. The method of claim 29, further comprising the step of:

forming on an end surface of said laser crystal proximate said non-linear optical crystal a part capable of partially reflecting the light of the laser fundamental wave.

38. The method of claim 37 further comprising the step of:

focusing the exciting laser light with a microlens made of optical glass material on an end surface of said laser crystal at an exciting side of said laser crystal.

39. The method of claim 37, further comprising the step of:

positioning a micromirror made of optical glass material in said optical resonator on an end surface at a light emitting side of said non-linear optical crystal opposite said laser crystal.

40. The method of claim 29 further comprising the step of:

focusing the exciting laser light with a microlens made of optical glass material on an end surface of said laser crystal at an exciting side of said laser crystal.

41. The method of assembling a solid-state laser apparatus as defined in claim 40, further comprising the steps of providing a reflective coating on said microlens and using said microlens having said coating as a mirror in said laser resonator.

42. The method of claim 29, further comprising the step of:

positioning a micromirror made of optical glass material in said optical resonator on an end surface at a light emitting side of said non-linear optical crystal opposite said laser crystal.

43. The method of claim 42 comprising the steps of:

forming between said laser and non-linear optical crystals a cavity of square cross-section capable of transmitting the laser light therethrough, said spacer rigidly fixing said laser and non-linear crystals to each other.

44. A solid-state laser apparatus comprising:

means for emitting an exciting laser light;

means for producing from the exciting laser light a light of a laser fundamental wave and a light of a second harmonic wave, including a laser crystal with an end surface configured to partially reflect the light of the laser fundamental wave, configured to be pumped by said exciting laser light, an optical resonator for generating the light of the laser fundamental wave from said exciting laser light and having an interior in which the laser crystal is disposed to emit light of the laser fundamental wave upon receiving, said exciting laser light, a non-linear optical crystal configured to generate light of a secondary harmonic wave from the light of said laser fundamental wave, means for connecting and unitarily combining the laser crystal and the non-linear optical crystal such that the partially reflecting laser crystal end surface faces the non-linear optical crystal, means for generating the light of the secondary harmonic wave using partial reflection of the light of the laser fundamental wave from at least one of said end surface of said laser crystal and an end surface of said non-linear optical crystal facing the laser crystal, and means for outputting the light of the secondary harmonic wave.

* * * * *